United States Patent Office 2,982,727
Patented May 2, 1961

2,982,727

LUBRICANTS CONTAINING SALTS AND ESTERS OF OXYGEN-CONTAINING ACIDS OF PHOSPHORUS

Warren C. Pattenden, Courtright, Ontario, Samuel B. Baker, Sarnia, Ontario, and James H. Norton, Corunna, Ontario, Canada, assignors to Esso Research and Engineering Company, a corporation of Delaware No Drawing. Filed Dec. 31, 1957, Ser. No. 706,286

6 Claims. (Cl. 252—32.5)

This invention relates to certain salts and esters of oxygen containing acids of phosphorus and their use in lubricating compositions. Particularly, the invention relates to lubricating oil compositions containing certain metal salts, or alkyl esters of phosphonic and phosphinic acids.

Lubricating oils, including synthetic, as well as mineral oils which are quite inert chemically, are gradually oxidized in the presence of air or other oxygen-containing materials to produce acidic products, gums, sludge-forming materials, and other objectionable products which cause quality deterioration. Both organic and inorganic materials have been proposed in the past for addition to, or treatment of lubricating oils to inhibit such oxidation and some of these have been quite successful. Unfortunately, many of the successful oxidation inhibitors contribute to other undesirable characteristics, such as corrosion of metals, or reduction in the viscosity index of the oil. It has now been found that certain substituted phosphinic and phosphonic acids are excellent oxidation inhibitors and overcome many of the disadvantages of prior antioxidants.

The esters and salts of the phosphonic and phosphinic acids of the invention can be represented by the general formula:

$$R-P(=O)(OM)X$$

wherein:
R represents the radicals (A)
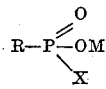

said R' being hydrogen or a $C_1$ to $C_{10}$ alkyl radical; and (B)     M'OOCR"— said R" being a $C_1$ to $C_{10}$ aliphatic saturated, straight or branched-chain hydrocarbon group and M' being a metal;
M is either a metal or a $C_1$ to $C_{10}$ alkyl group; and
X is R or —OR''', wherein R is the same as defined above while R''' is a $C_1$ to $C_{10}$ alkyl radical.

The metal component of the above type of materials may be an alkali metal such as lithium, sodium and potassium, or an alkaline earth metal such as calcium, barium, strontium and magnesium. The alkali metals such as lithium and sodium are preferred. Examples of the alkyl groups encompassed by the above formula include methyl, ethyl, propyl, pentyl, octyl, isooctyl, decane, etc., while the aliphatic hydrocarbon radicals include ethylene, propylene, n-octylene, etc.

Depending upon the nature of X, the above formula represents either phosphonic or phosphinic acid derivatives. Thus, when X is R, the formula represents phosphonic acid derivatives, while when X is —OR''', the formula represents phosphinic materials. Specific examples of materials represented by the above formula which are used in the working examples of the invention are:

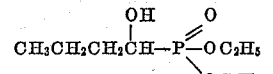
Diethyl alpha-hydroxybutyl phosphonate

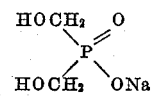
Sodium di(hydroxymethyl)phosphinate

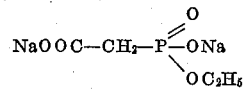
Disodium ethyl carboxymethanephosphonate and

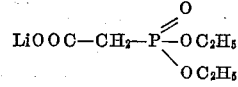
Lithium diethyl carboxymethanephosphonate

Examples of other specific materials which can be used include calcium di-n-octyl carboxypentylphosphonate, sodium di-(alpha-hydroxyisopropyl) phosphinate, and barium dioctyl alpha-hydroxydecylphosphonate, etc. The salts and esters of the phosphinic and phosphonic acids of the types defined above, as well as their preparation, are known to the art. Thus, the present invention relates only to lubricating compositions containing these materials.

Detailed preparations of materials of the above type may be found in the book "Organo-Phosphorus Compounds" by Gennady M. Kosolapoff, published by John Wiley & Sons, Inc., in 1950. On page 121 of the text, the author discusses the Michaelis-Arbuzov reaction, which may be represented by the following equations:

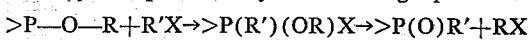

This reaction is taught as taking place with any derivative of trivalent phosphorus that carries an ester group OR, and an organic halide R'X. The reaction is frequently used with tertiary phosphites having a formula $(RO)_3P$. This type of reaction was followed in preparing the triethyl carboxymethane phosphonate used in the preparation of the salt of Example III which follows: Specifically, one mole each of triethyl phosphite and ethyl chloroacetate were placed in a flask equipped with a nitrogen inlet tube and an efficient reflux condenser. The homogeneous mixture was heated gently under a nitrogen blanket. Ethyl chloride was given off as shown in the following equation:

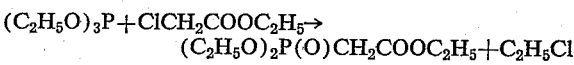

The ethyl chloride was trapped in a receiver cooled with $CO_2$. After about 1½ hours, evolution of $C_2H_5Cl$ ceased. About 0.95 mol of product was obtained indicating 95% conversion. The product was distilled under vacuum and recovered at 152–153° C. at 20 mm. pressure. The sodium and lithium salts can be prepared by refluxing the product with suitable mol proportions of aqueous sodium and lithium hydroxide. The salt can be recovered from the aqueous solution by distilling off the water and ethyl alcohol by-product under vacuum.

The ester and salt additives of the invention may be used to prevent oxidation and to impart other properties to oil compositions, wherein the base oil is either a mineral lubricating oil, or a synthetic lubricating oil. Thus, they can be used with such synthetic lubricants as: esters of monobasic acids (e.g., $C_8$ Oxo alcohol ester of $C_8$ Oxo acid), esters of dibasic acids (e.g., di-2-ethyl hexyl sebacate), esters of glycols (e.g., $C_{13}$ Oxo acid diester of tetraethylene glycol), complex esters, esters of phosphoric acid, halocarbon oils, sulphite esters, silicone oils, carbonates, polyglycol-type synthetic oils, etc., or any mixture thereof.

The additives of the invention are also useful in any compositions containing a substantial amount of lubricating oil, e.g., lubricating greases. In fact, grease compositions containing the additives of the invention represent the preferred form of the invention, since greases have sufficient body or consistency to maintain the additives suitably dispersed. Thus, many of the additives of the invention, particularly the metal salts, are oil-insoluble. In greases, this does not represent a problem, but in liquid lubricants there is a definite tendency for the oil-insoluble materials per se to settle out from the dispersion. This can be overcome by use of suitable dispersing agents, such as sodium petroleum sulfonate, and therefore does not represent a serious limitation.

The grease compositions in which the additives can be used, will usually contain about 3.0 to 35.0 wt. percent, e.g., 3 to 20 wt. percent, based on the total weight of the composition, of a salt, soap, or a mixed-salt or soap-salt thickener, or a polymeric thickener such as polyethylene, or inorganic thickeners such as graphite, carbon black, clays, etc. Such salt and soap thickeners are generally metal salts of monocarboxylic acids, such as fatty acids or sulfonic acids. The soap-salt and mixed-salt thickeners are generally complex thickeners which are prepared by the neutralization of a high molecular weight fatty acid, and/or an intermediate molecular weight fatty acid, and a low molecular weight fatty acid, with metal bases, generally alkali or alkaline earth metal bases.

The high molecular weight fatty acids or aliphatic monocarboxylic acids useful for forming the soaps, soap-salt and mixed-salt thickeners include naturally-occurring or synthetic, substituted and unsubstituted, saturated and unsaturated, mixed or unmixed fatty acids having about 12 to 30, e.g., 16 to 24, carbon atoms per molecule. Examples of such acids include stearic, hydroxy stearic, such as 12-hydroxy stearic, di-hydroxy stearic, polyhydroxy stearic and other saturated hydroxy fatty acids, arachidic, oleic, linoleic, ricinoleic, hydrogenated fish oil and tallow acids.

Intermediate molecular weight fatty acids used in preparing salt type grease thickeners include those aliphatic, saturated or unsaturated, unsubstituted, monocarboxylic acids containing 7 to 10 carbon atoms per molecule, e.g., capric, and caprylic acids.

Suitable low molecular weight acids for preparing salt type thickeners include saturated and unsaturated, substituted and unsubstituted aliphatic monocarboxylic acids having about 1 to 6 carbon atoms. These acids include fatty acids such as formic, acetic, propionic, and similar acids, including their hydroxy derivatives such as lactic acid, etc. Acetic acid or its anhydride is preferred.

The metal component of the soaps, salts, mixed-salts or soap-salt thickeners of this invention may be any soap-forming metal such as aluminum, but generally is an alkali metal such as lithium, potassium, and sodium, or an alkaline earth metal such as calcium, strontium, barium and magnesium. The metals are usually reacted with the appropriate acids in the form of metal bases, such as hydroxides and oxides.

When desired, the soaps, soap-salt or mixed-salt grease thickeners can be prepared by neutralizing the carboxylic acids with the metal bases in situ in the lubricating oil, followed by heating the resultant composition for a time and at a temperature sufficient to dehydrate the mixture and to form the soap and/or salt. Simple salts, soaps, and mixtures thereof are generally formed on heating to 320° to 430° F., while heating to 430° to 600° F. is usually necessary if it is desired to form complexed soap-salt or mixed-salt materials.

The antioxidant salts and esters of the phosphorus containing acids of the invention can be added to the lubricant in amounts of .05 to 10.0, preferably .5 to 5.0 wt. percent, based on the total weight of the composition. The lubricant in turn can be either a lubricating oil composition or a lubricating grease. If the lubricant contains metal containing compounds, for example metal soap as a thickening agent in the case of a grease, and a metal salt of phosphinic or phosphonic acid is to be added as an antioxidant, then it is frequently desirable that the metal portion of the antioxidant be the same metal that is already present in the lubricant. For example, it is preferred to use a lithium salt of a phosphinic or phosphonic acid material in a lithium soap grease, while a sodium phosphinate or phosphonate is preferred for a sodium soap grease. The reason for this, is that there is a tendency for a metal exchange to take place between the metal phosphonate or metal phosphinate and other metal containing compounds. While this metal exchange does not interfere with the antioxidant properties of the phosphonate or phosphinate materials, it can in some instances have a deleterious effect upon the grease. Thus, lithium greases have excellent water resistance, while sodium greases have poorer water resistance. However, by using a sodium phosphonate derivative in a water resistant lithium soap grease, some lithium phosphonate material will eventually form as well as some sodium soap thickener. Now the lithium phosphonate will still be a god antioxidant, however the sodium soap thickener will lower the water resistance of the grease. Of course, in lubricants containing no other metal component, this possibility does not arise.

The lubricating oil and grease compositions may, of course, contain other additive materials, e.g., oxidation inhibitors, such as phenyl-alpha-naphthylamine; viscosity index improvers, such as polyisobutylene; corrosion inhibitors, such as sorbitan monooleate; dispersing agents, such as sodium petroleum sulfonates; pour depressants; dyes; and the like.

The salts and esters additive materials of the invention can be incorporated into the lubricant in several ways. If the additive is an ester and is oil-soluble, then of course, it can be incorporated by simple mixing with the lubricant. If the additive is a salt and is oil-insoluble, then simple mixing is not preferred since the salt will not generally disperse in the oil in a fine enough form. Preferably, in these cases, the salt is first dissolved in water, and the aqueous solution then mixed with the oil composition, followed by heating to evaporate the water carrier and to dehydrate the composition. If the oil composition is a viscous grease, then it may be heated so as to thin it out or melt it so that better mixing is obtained with the aqueous salt solution. Still another method of obtaining a fine dispersion is by forming the salt in situ in at least a portion of the lubricant, by neutralizing the phosphonic acid or phosphinic acid material with a metal base, e.g. $LiOH \cdot H_2O$, and then dehydrating. This latter method is generally applicable when the phosphonic or phosphinic acid material contains about 8 carbon atoms or more so that it is oil-soluble.

The invention will be further understood by the following examples, which include preferred embodiments of the invention:

EXAMPLE I 4.6 wt. percent of a phosphonate ester having the general formula: $(C_2H_5O)_2P(O)CHOHCH_2CH_2CH_3$ was added to 95.4 wt percent of a base grease composition. Since the ester was oil-soluble, the addition was carried out by simple mixing at room temperature. This base grease, which is a commercial composition, consisted of 74.2 wt. percent of a mineral lubricating oil having a viscosity at 100° F. of 500 SUS and a viscosity index of 90; 23.0 wt. percent of sodium 12-hydroxystearate as a thickener; 1.8 wt. percent of a mineral oil concentrate of sodium petroleum sulfonate, which concentrate in turn consisted of 63 wt. percent sulfonate of about 375 molecular weight; and 1 wt. percent of phenyl α-naphthylamine.

EXAMPLE II 2.5 wt. percent of the neutral sodium salt of bishydroxymethyl phosphinic acid, having the formula $$(HOCH_2)_2P(O)ONa$$

in a water solution was mixed with 97.5 wt. percent of the base grease described in Example I. In order to facilitate dispersion, the base grease was maintained at 300° F. while the aqueous solution of the sodium salt was added. After the phosphinic acid salt was added, heat was applied and the mixture was maintained at 300° F. until dry, i.e. no more steam evolved. The temperature was then increased until the mixture reached 420° F. in order to obtain complete dehydration. The heat was turned off and the mixture was stirred as it cooled to 140° F., after which it was allowed to cool to room temperature without stirring.

EXAMPLE III 4.7 wt. percent of the disodium ethyl carboxymethanephosphonate having the formula:

$$(C_2H_5O)(NaO)P(O)CH_2COONa$$

was added to 95.3 wt. percent of the base grease of Example I according to the method described in Example II.

The products of Examples I to III were then tested for oxidation inhibition by packing 5.0 grams of the grease material into a weighed steel ball-and-roller bearing, hanging the bearing in an oven maintained at 300° F., then periodically determining the micropenetration at 77° F. of the grease. The test was considered completed when the grease reached a micropenetration of 5, since prior experience has demonstrated this to be the point at which the useful service life of the grease ceases and it fails.

For comparison purposes, the base grease containing none of the phosphorus-containing additive was tested for oxidation resistance, as was another sample consisting of 97.0 wt. percent of the base grease and 3.0 wt. percent of trisodium phosphate. The results of the above oxidation tests are reported in the following table:

Table

EVALUATION OF OXIDATION INHIBITORS IN GREASE

| Example | Added Inhibitor in Base Grease [1] | Oxidation Results at 300° F., Hours to Failure |
|---|---|---|
|  | None | 1,100 |
|  | 3.0 wt. percent—trisodium phosphate | 1,500 |
| I | 4.6 wt. percent— $(EtO)_2P(O)CHOHCH_2CH_2CH_3$ | 2,400 |
| II | 2.5 wt. percent—$(HOCH_2)_2P(O)ONa$ | 1,840 |
| III | 4.4 wt. percent— $(EtO)(NaO)P(O)CH_2COONa$ | 2,400 |

[1] Base grease consisted of 23% sodium 12-hydroxystearate, 1.8 wt. percent of sodium petroleum sulfonate (63 wt. percent concentrate), 1.0 wt. percent of phenyl-α-naphthylamine and 74.2% mineral oil.

As seen from the above table, the base grease itself had a useful service life of 1,100 hours at 300° F., even though it contained about an optimum amount, i.e. 1%, of phenyl-α-naphthylamine which is a well known antioxidant for grease compositions. The addition of 3.0 wt. percent of trisodium phosphate increased the service life 400 hours to a total of 1,500 hours. However, the materials of the invention (Examples I to III) showed a very marked improvement, increasing the service life by 740 hours (Example II), to as much as 1,300 additional hours as in Examples I and III.

Some of the materials of the invention have a very marked effect upon increasing the dropping point of lithium greases. Thus, while lithium soap greases are desirable because of their excellent water resistance, they do not have high dropping points. This is illustrated by the following example:

EXAMPLE IV 10.0 wt. percent of stearic acid and 7.7 wt. percent of a material of the formula: $(CH_3CH_2O)P(O)CH_2COOH$ was added to 77.8 wt. percent of a mineral lubricating oil having a viscosity at 210° F. of 50 SUS. This mixture was warmed to 220° F., then neutralized with 4.5 wt. percent if $LiOH \cdot H_2O$, which was added in the form of an aqueous solution. The mixture was then heated to 350° F. and cooked until anhydrous and then allowed to cool. The resulting grease composition had an ASTM dropping point of 520° F., and an ASTM penetration at 770 F. of 210 mm./10. This dropping point of 520° F. was surprisingly high and unexpected since lithium stearate greases melt at about 370° F.

To further illustrate the invention, a composition containing an alkaline earth metal salt in a synthetic oil can be prepared as follows: 1.0 wt. percent of calcium dioctyl carboxypentanephosphonate in a saturated aqueous solution is mixed with 99.0 wt. percent of a lubricant consisting of 15.0 wt. percent calcium stearate and 85.0 wt. percent of di-(2-ethylhexyl)sebacate. The resulting mixture is then heated to about 300° F. until dry, and then cooled.

What is claimed is:

1. A lubricating oil composition comprising a major amount of lubricating oil and an oxidation inhibiting amount of a material of the general formula:

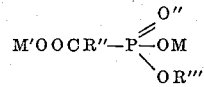

wherein M selected from the group consisting of alkali metals, alkaline earth metals and $C_1$ to $C_{10}$ aliphatic saturated hydrocarbon groups, M' is selected from the group consisting of alkali metals and alkaline earth metals, R" is a $C_1$ to $C_{10}$ aliphatic saturated hydrocarbon group and R'" is a $C_1$ to $C_{10}$ alkyl group.

2. A lubricating oil composition according to claim 1, wherein said lubricating oil is a mineral lubricating oil.

3. A lubricating oil composition according to claim 1, wherein said lubricating composition is a grease containing a thickening amount of a grease thickener.

4. A lubricating oil composition comprising a major amount of mineral lubricating oil and about 0.5 to 10 wt. percent of a material of the formula:

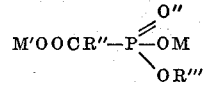

wherein M and M' are alkali metals, R" is a $C_1$ to $C_{10}$ aliphatic saturated hydrocarbon group and R'" is a $C_1$ to $C_{10}$ alkyl group.

5. A lubricating oil composition according to claim 4, wherein said material is disodium ethyl carboxymethanephosphonate.

6. A lubricating oil composition according to claim 4, wherein said material is lithium diethyl carboxymethanephosphonate.

References Cited in the file of this patent

UNITED STATES PATENTS

| 2,363,510 | Farrington et al. | Nov. 28, 1944 |
| 2,382,043 | Farrington et al. | Aug. 14, 1945 |
| 2,628,949 | Butcosk | Feb. 17, 1953 |
| 2,758,971 | Mikeska | Aug. 14, 1956 |
| 2,837,481 | Hotten et al. | June 3, 1958 |